United States Patent

Wu et al.

[11] Patent Number: 5,817,903
[45] Date of Patent: Oct. 6, 1998

[54] HYDROTREATING CATALYST COMPOSITION AND PROCESSES THEREFOR AND THEREWITH

[75] Inventors: An-hsiang Wu, Bartlesville; Charles A. Drake, Nowata, both of Okla.

[73] Assignee: Phillips Petroleum Company, Bartlesville, Okla.

[21] Appl. No.: 834,514

[22] Filed: Apr. 4, 1997

[51] Int. Cl.⁶ ...................................................... C07C 4/18
[52] U.S. Cl. ......................... 585/486; 585/470; 585/475; 585/483; 585/488; 585/489; 208/136; 208/137
[58] Field of Search .................................. 585/470, 471, 585/475, 476, 483, 486, 488, 489; 208/136, 137; 902/78

[56] References Cited

U.S. PATENT DOCUMENTS

| | | | |
|---|---|---|---|
| 3,317,662 | 5/1967 | Hoertz, Jr. et al. | 260/672 |
| 3,725,303 | 4/1973 | Urban et al. | 252/439 |
| 3,729,521 | 4/1973 | Gutberlet et al. | 260/672 T |
| 3,894,930 | 7/1975 | Hensley, Jr. | 208/60 |
| 3,969,221 | 7/1976 | Mitchell, III et al. | 208/139 |
| 4,054,539 | 10/1977 | Hensley, Jr. | 252/455 Z |
| 4,162,214 | 7/1979 | Maslyansky et al. | 585/471 |
| 4,288,347 | 9/1981 | Rabinovitch et al. | 252/439 |
| 4,522,935 | 6/1985 | Robinson et al. | 502/223 |
| 4,664,776 | 5/1987 | Ward | 208/111 |
| 4,837,193 | 6/1989 | Akizuki et al. | 502/242 |
| 5,290,429 | 3/1994 | Delaney et al. | 208/145 |
| 5,406,016 | 4/1995 | Cook et al. | 585/475 |
| 5,552,063 | 9/1996 | Yan | 210/763 |

FOREIGN PATENT DOCUMENTS 1343172  1/1974  United Kingdom ............. C07C 3/58

*Primary Examiner*—Bekir L. Yildirim
*Attorney, Agent, or Firm*—Lucas K. Shay

[57] ABSTRACT

A catalyst composition and a process for converting a $C_9+$ aromatic compound to $C_6$ to $C_8$ aromatic hydrocarbons such as xylenes are disclosed. The catalyst composition comprises a zeolite and a metal. The process comprises contacting a fluid stream containing a $C_9+$ aromatic compound with the catalyst composition under a condition sufficient to effect the production of $C_6$ to $C_8$ aromatic hydrocarbon. Also disclosed is a process for producing the catalyst composition which can comprise: (1) impregnating a zeolite with an effective and coke-reducing amount of a metal compound under a condition sufficient to effect the production of a metal-promoted zeolite and (2) calcining the metal-promoted zeolite.

24 Claims, No Drawings

HYDROTREATING CATALYST COMPOSITION AND PROCESSES THEREFOR AND THEREWITH

FIELD OF THE INVENTION

This invention relates to a catalyst composition useful for converting a $C_9+$ aromatic compound to a $C_6$ to $C_8$ aromatic hydrocarbon, to a process for producing the composition, and to a process for using the composition for converting a hydrocarbon to a $C_6$ to $C_8$ aromatic hydrocarbon.

BACKGROUND OF THE INVENTION

It is well known to those skilled in the art that aromatic hydrocarbons are a class of very important industrial chemicals which find a variety of uses in petrochemical industry. It is also well known to those skilled in the art that catalytically cracking gasoline-range hydrocarbons produces aromatic hydrocarbons such as, for example, benzene, toluene, and xylenes (hereinafter collectively referred to as BTX) in the presence of catalysts which contain a zeolite. The product of this catalytic cracking process contains a multitude of hydrocarbons including unconverted $C_5+$ alkanes, $C_5+$ alkenes, $C_5+$ cycloalkanes, or combinations of two or more thereof; lower alkanes such as methane, ethane, and propane; lower alkenes such as ethylene and propylene; and $C_9+$ aromatic compounds having 9 or more carbon atoms per molecule. Recent efforts to convert gasoline to more valuable petrochemical products have focused on improving the conversion of gasoline to more valuable aromatic hydrocarbons in the presence of zeolite catalysts. For example, a gallium-promoted zeolite ZSM-5 has been used in the so-called Cyclar Process to convert a hydrocarbon to BTX. The aromatic hydrocarbons can be useful feedstocks for producing various organic compounds and polymers. However, heavier, less useful aromatic compounds having 9 or more carbon atoms per molecule ($C_9+$ aromatic compounds) are also produced by the conversion process. Furthermore, a zeolite catalyst is generally deactivated in a rather short period, especially in a high sulfur and/or polyaromatics environment, because of depositions of carbonaceous material, generally coke, on the surface of the catalyst. Therefore, development of a catalyst and a process for converting a $C_9+$ aromatic compound to the more valuable BTX in which the process and catalyst reduce the depositions of the carbonaceous material would be a significant contribution to the art and to the economy.

SUMMARY OF THE INVENTION

An object of this invention is to provide a catalyst composition which can be used to convert a $C_9+$ aromatic compound to a $C_6$ to $C_8$ aromatic hydrocarbon. Also an object of this invention is to provide a process for producing the catalyst composition. Another object of this invention is to provide a process which can employ the catalyst composition to convert a $C_9+$ aromatic compound to a $C_6$ to $C_8$ aromatic hydrocarbon. An advantage of the catalyst composition is that it enhances the production of BTX and suppresses the deposition of coke thereon. Other objects and advantages will becomes more apparent as this invention is more fully disclosed hereinbelow.

According to a first embodiment of the present invention, a composition which can be used as a catalyst for converting a $C_9+$ aromatic compound to a $C_6$ to $C_8$ aromatic hydrocarbon is provided. The composition comprises, consists essentially of, or consists of, a zeolite having incorporated therein a metal selected from the group consisting of molybdenum, cobalt, and combinations thereof.

According to a second embodiment of the present invention, a process which can be used for producing a catalyst composition is provided. The process comprises the steps: (1) contacting a zeolite with a coke-reducing amount of a molybdenum-containing compound, under a condition sufficient to effect the production of a zeolite having a reduced coking rate in a transalkylation process, whereby a molybdenum-promoted zeolite is formed; (2) contacting said molybdenum-promoted zeolite with a further coke-reducing amount of a cobalt-containing compound under a condition effective to produce a zeolite having a reduce coking rate in a transalkylation process; whereby a molybdenum- and cobalt-promoted zeolite is formed; and (3) contacting the molybdenum- and cobalt-promoted zeolite with a reducing agent. Steps (1) and (2) can be carried out simultaneously. The order of steps (1) and (2) can also be reversed.

According to a third embodiment of the present invention, a process, which can be used for converting a $C_9+$ aromatic compound to a $C_6$ to $C_8$ aromatic hydrocarbon and for reducing the deposition of carbonaceous material on the surface of a catalyst is provided, which comprises, consists essentially of, or consists of, contacting a fluid which comprises a $C_9+$ aromatic compound with a catalyst composition which can be the same as disclosed above in the first embodiment and can be made by the process disclosed above in the second embodiment of the invention under a condition effective to convert a $C_9+$ aromatic compound to an aromatic hydrocarbon containing 6 to 8 carbon atoms per molecule.

DETAILED DESCRIPTION OF THE INVENTION

The catalyst composition of the first embodiment of the present invention comprises a zeolite having incorporated therein, preferably impregnated thereon a metal selected from the group consisting of molybdenum, cobalt, and combinations thereof. The metal can be, and generally is chemically bonded to oxygen or sulfur.

According to the present invention, the term "coke" refers to a semi-pure carbon generally deposited on the surface of a metal wall or a catalyst. The weight ratio of the metal to the zeolite can be any ratio that is effective to convert a $C_9+$ aromatic compound to an aromatic hydrocarbon containing 6 to 8 carbon atoms per molecule. Generally, the weight ratio of the metal to the zeolite can be in the range of from about 0.0001:1 to about 0.3:1, preferably about 0.0005:1 to about 0.2:1, and most preferably 0.001:1 to 0.1:1. The weight ratio of the incorporated cobalt to molybdenum, if both are present in the composition, can be any ratio that can enhance the conversion of a $C_9+$ aromatic compound to a BTX and can be in the range of from about 0.01:1 to about 1:1, preferably about 0.05:1 to about 0.5:1, and most preferably 0.1:1 to 0.4:1.

The composition can also be characterized by having the following physical characteristics: a surface area, as determined by the BET method using nitrogen, in the range of from about 50 to about 1,000, preferably 50 to 500 m$^2$/g; a micropore pore volume in the range of from about 0.1 to about 2.0, preferably about 0.1 to about 1.0 ml/g; an average micropore pore diameter in the range of from about 0.1 to about 500, preferably about 1 to about 200 Å; and a porosity of more than about 20%.

The composition of the present invention can be prepared by combining a zeolite and the metal or metals in the weight ratios disclosed above according to any methods well known to one skilled in the art. However, it is presently preferred that the composition of the present invention be produced by the process disclosed in the second embodiment of the invention.

Any commercially available zeolites can be employed as a starting material of the process of the second embodiment of the invention. Examples of suitable zeolites include, but are not limited to, those disclosed in Kirk-Othmer Encyclopedia of Chemical Technology, third edition, volume 15 (John Wiley & Sons, New York, 1991). The presently preferred zeolite is a mordenite because it is highly acidic and shape-selective.

According to the second embodiment of the invention, a zeolite, preferably a mordenite, can be optionally contacted with one or more suitable binders in a liquid, preferably aqueous medium, to form a zeolite-binder mixture. Any binders known to one skilled in the art for use with a zeolite are suitable for use herein. Examples of suitable binder include, but are not limited to, clays such as for example, kaolinite, halloysite, vermiculite, chlorite, attapulgite, smectite, montmorillonite, illite, saconite, sepiolite, palygorskite, diatomaceous earth, and combinations of any two or more thereof, aluminas such as for example α-alumina and γ-alumina; silicas; alumina-silica; aluminum phosphate; aluminum chlorohydrate; and combinations of any two or more thereof. Because these binders are well known to one skilled in the art, description of which is omitted herein. The weight ratio of a zeolite to a binder can be in a wide range and generally in the range of from about 200:1 to about 0.1:1, preferably 100:1 to 0.01:1.

The zeolite and the binder can be well mixed by any means known to one skilled in the art such as stirring, blending, kneading, or extrusion, following which the zeolite-binder mixture can be dried in air at a temperature in the range of from about 20° to about 800° C., for about 0.5 to about 50 hours, preferably under atmospheric pressure. Thereafter, the dried, zeolite-binder mixture can be further calcined, if desired, in air at a temperature in the range of from about 300° to 1000° C., preferably about 350° to about 750° C., and most preferably 450° to 650° C. to prepare a calcined zeolite-binder for about 1 to about 30 hours. If a binder is not desired, a zeolite can also be calcined under similar conditions to remove any contaminants, if present, to prepare a calcined zeolite.

A zeolite, a calcined zeolite, or a calcined zeolite-binder can be treated with a compound containing an exchangeable ammonium ion to prepare an ammonium-exchanged zeolite. Whether a zeolite is calcined or contains a binder, the process or treatment in the second embodiment is the same for each. For the interest of brevity, only a zeolite is described hereinbelow. Examples of suitable ammonium-containing compounds include, but are not limited to, ammonium sulfate, ammonium chloride, ammonium nitrate, ammonium bromide, ammonium fluoride, and combinations of any two or more thereof. Treatment of the zeolite replaces the original ions such as, for example, alkali or alkaline earth metal ions of the zeolite with predominantly ammonium ions. Techniques for such treatment are well known to one skilled in the art such as, for example, ion exchange of the original ions. For example, a zeolite can be contacted with a solution containing a salt of the desired replacing ion or ions.

Generally, a zeolite can be suspended in an aqueous solution of an ammonium-containing compound. The concentration of the zeolite in the aqueous solution can be in the range of from about 0.01 to about 800, preferably about 0.1 to about 500, more preferably about 1 to about 400, and most preferably 5 to 100 grams per liter. The amount of the ammonium-containing compound required depends on the amount of the original ion(s) to be exchanged. Upon the preparation of the solution, the solution can be subject to a temperature in the range of from about 30° C. to about 200° C., preferably about 40° C. to about 150° C., and most preferably 50° C. to 125° C. for about 1 to about 100 hours, preferably about 1 to about 50 hours, and most preferably 2 to 25 hours depending on desired degrees of ion exchange. The treatment can be carried out under a pressure in the range of from about 1 to about 10 atmospheres (atm), preferably about 1 atm or any pressure that can maintain the required temperature. Thereafter, the treated zeolite can be washed with running water for 1 to about 60 minutes followed by drying and calcining to produce calcined hydrogen-form zeolite. The drying and calcining processes can be carried out substantially the same as those disclosed above for the preparation of a calcined zeolite or zeolite-binder.

Generally, the ammonium-exchanged zeolite becomes hydrogen exchanged upon calcination or high temperature treatment such that a predominant proportion of its exchangeable cations are hydrogen ions. The above-described ion exchanges of exchangeable ions in a zeolite is well known to one skilled in the art. See, for example, U.S. Pat. No. 5,516,956, disclosure of which is incorporated herein by reference. Because the ion exchange procedure is well known, the description of which is omitted herein for the interest of brevity.

In the first step of the second embodiment of the invention, a zeolite in a desired ionic form, regardless whether calcined or containing a binder, can be calcined, if desired, under a condition known to those skilled in the art to remove contaminants, if any. Generally such a condition can include a temperature in the range of from about 250° to about 1,000°, preferably about 350° to about 750°, and most preferably 450° to 650° C. and a pressure that can accommodate the temperatures and can be in the range of from about 0.5 to about 50, preferably about 0.5 to about 30, and most preferably 0.5 to 10 atmospheres (atm) for about 1 to about 30 hours, preferably about 2 to about 20 hours, and most preferably 3 to 15 hours.

Thereafter, the zeolite, whether it has been calcined or not, can be incorporated therein, or preferably impregnated or coated thereon, with a metal compound whose metal is selected from the group consisting of molybdenum, cobalt, and combinations thereof. Any metal compound that can promote the incorporating or impregnating of a zeolite with the metal of the metal compound can be employed in the present invention.

Generally, any metal-containing compound that can promote the combining of the metal element with a zeolite can be employed herein. Examples of suitable metal compounds include, but are not limited to, molybdenum(II) acetate, ammonium molybdate, ammonium dimolybdate, ammonium heptamolybdate, phosphomolybdic acid, molybdenum (III) bromide, molybdenum(II) chloride, molybdenum(IV) chloride, molybdenum(V) chloride, molybdenum hexacarbonyl, molybdenum(IV) sulfide, sodium molybdate, potassium molybdate, molybdenum oxychloride, molybdenum fluoride, molybdenum(VI) tetrachloride oxide, ammonium tetrathiomolybdate, cobalt(II) acetate, cobalt(II) acetylacetonate, cobalt(III) acetylacetonate, cobalt(II) benzoylacetonate, cobalt(II) bromide, cobalt(II) carbonate, cobalt(II) chloride, cobalt(II) 2-ethylhexanoate, cobalt(II) fluoride, cobalt(III) fluoride, cobalt(II) iodide, cobalt(II)

iodide, cobalt(II) 2,3-naphthalocyanine, cobalt(II) nitrate, cobalt(II) oxalate, cobalt(II) perchlorate, cobalt(II) phthalocyanine, cobalt(II) sulfate, cobalt(II) thiocyanate, cobalt(II) tungstate, and combinations of any two or more thereof. The presently preferred metal compounds are an ammonium molybdate and cobalt nitrate for they are readily available and effective for incorporating Mo and Co into a zeolite.

A metal-promoted or metal-impregnated zeolite can be prepared by any suitable, effective means so long as the resulting zeolite can be used in the process of the present invention. Preferably, a zeolite which can have been compounded with a binder as described above and have been shaped by any means known in the art such as, for example, pelletized, extruded, tableted, or combinations of two or more thereof, can be impregnated such as, for example, by incipient wetness method with a solution, preferably aqueous solution, containing a suitable metal compound disclosed above under a condition well known to one skilled in the art such as, for example, at about 25° C. for about 1 minute to about 10 hours under atmospheric pressure. The concentrations of the metal compound in the impregnating solution and the weight ratio of this solution to the zeolite are chosen such as to provide a finished, metal-impregnated, zeolite which contains the desired content of metal which can effect the reduction of coke deposition on the surface of the composition of the present invention as disclosed above in the first embodiment of the present invention. Because the impregnation process is well known to one skilled in the art, the description of which is omitted herein.

After the incorporation or impregnation with a metal compound has been completed, the metal-impregnated zeolite can then be dried, as disclosed above and then calcined. Generally the calcination is carried out in air under the pressure range disclosed above. The calcination can also be carried out at a temperature in the range of about 300° to about 1000° C. for about 1 to about 30 hours, preferably about 400° C. to about 800° C. for 1 to about 20 hours, and most preferably 450° C. to 650° C. for 2 to 15 hours.

The impregnation of molybdenum and cobalt can be carried out simultaneously. The impregnation of molybdenum and cobalt can also be carried out sequentially by impregnating one metal first followed by impregnating another metal with optional calcination between impregnations.

The presently preferred process for incorporating or impregnating molybdenum, or cobalt, or both onto a zeolite is a sequential impregnation. The sequential impregnation comprises (1) impregnating molybdenum onto a zeolite to form a molybdenum-impregnated zeolite; (2) calcining the molybdenum-impregnated zeolite to form a calcined molybdenum-impregnated zeolite; (3) impregnating cobalt onto the calcined molybdenum-impregnated zeolite to form a cobalt- and molybdenum-impregnated zeolite; and (4) calcining the cobalt- and molybdenum-impregnated zeolite. The process for each impregnation or calcination is the same as that disclosed above. The process can also be carried out by first impregnating cobalt in step (1) onto a zeolite followed by calcining and then impregnating molybdenum onto a calcined cobalt-impregnated zeolite to form a cobalt- and molybdenum-impregnated zeolite which is then subject to calcining.

The calcined, metal-impregnated zeolite can then be treated with a reducing agent to reduce the oxidation state of the metal. For example, if the metal is molybdenum, the oxidation state of molybdenum can be reduced to less than 6. The presently preferred reducing agent is a hydrogen-containing fluid which comprises molecular hydrogen ($H_2$) in the range of from 1 to about 100, preferably about 5 to about 100, and most preferably 10 to 100 volume %. The reduction can be carried out at a temperature, in the range of from about 250° C. to about 800° C. for about 0.1 to about 10 hours preferably about 300° C. to about 700° C. for about 0.5 to about 7 hours, and most preferably 350° C. to 550° C. for 1 to 5 hours. If the calcined, metal-impregnated zeolite is not first treated with a reducing agent, the composition of the present invention can be treated with a reducing agent as described herein prior to use of the composition of the invention.

Upon completion of the above-described treatment or impregnation of zeolite with a metal compound, a metal-promoted zeolite composition is produced which can then be used in the third embodiment of the present invention.

According to the third embodiment of the present invention, a process, useful for converting a hydrocarbon, preferably a $C_9+$ aromatic compound, to a mixture rich in $C_6$ to $C_8$ aromatic hydrocarbons, comprises, consists essentially of, or consists of contacting a fluid stream with a catalyst composition, optionally in the presence of an inert gas, preferably a hydrogen-containing fluid, under a condition sufficient to enhance or effect the conversion of a $C_9+$ aromatic compound to a mixture rich in $C_6$ to $C_8$ aromatic hydrocarbons wherein said fluid stream can comprise $C_9+$ aromatic compounds, paraffins, olefins, naphthenes. The catalyst composition is the same as that disclosed in the first embodiment of the invention which can be prepared by the second embodiment of the invention.

The term "fluid" is used herein to denote gas, liquid, vapor, or combinations thereof. The term "enhance" refers to an increased BTX in the product employing the catalyst composition as compared to employing an untreated zeolite. Examples of a hydrocarbon include, but are not limited to, butane, isobutanes, pentane, isopentanes, hexane, isohexanes, cyclohexane, methylcyclohexane, heptane, isoheptanes, octane, isooctanes, nonanes, decanes, undecanes, dodecanes, tridecanes, tetradecanes, pentadecanes, hexadecanes, butenes, isobutene, pentenes, hexenes, 1,2,3-trimethylbenzene, 1,2,4-trimethylbenzene, 1,3,5-trimethylbenzene, 1,2,3,4-tetramethylbenzene, 1,2,3,5-tetramethylbenzene, 1,2,4,5-tetramethylbenzene, n-propylbenzene, 3-ethyltoluene, 4-ethyltoluene, 3-n-propyltoluene, 4-n-propyltoluene, 1,3-diethylbenzene, naphthalenes, and combinations of any two or more thereof. Some feed fluids, such as, for example, gasoline, can comprise some benzene, toluene, ethylbenzene, and xylenes.

Any fluid which contains a $C_9+$ aromatic compound can be used as the feed for the process of this invention. Generally, the fluid feed stream can also contain olefins, naphthenes (cycloalkanes), or some aromatic compounds. Examples of suitable, available fluid feeds include, but are not limited to, gasolines from catalytic oil cracking processes, pyrolysis gasolines from thermal cracking of saturated hydrocarbons, naphthas, gas oils, reformates, and combinations of any two or more thereof. The origin of this fluid feed is not critical. Though particular composition of a feed is not critical, a preferred fluid feed is derived from gasolines which generally contain more paraffins (alkanes) than combined content of olefins, cycloalkanes, and aromatic compounds.

Any fluid which contains a $C_9$ + aromatic compound as disclosed above can also be used as the feed for the process of this invention. A $C_9+$ aromatic compound can have the formula of $R'_qAr$ wherein each R' is a hydrocarbyl radical having 1 to about 15 carbon atoms and is independently selected from the group consisting of alkyl radicals, aryl radicals, alkaryl radicals, aralkyl radicals, alkenyl radicals, and combinations of any two or more thereof, q is a whole number from 1 to 5, and Ar is a phenyl group. The origin of the $C_9+$ aromatic compounds feed is not critical. However, a preferred fluid feed is a $C_9+$ aromatic compound derived from the heavies fraction of a product from a paraffin, in particular gasoline, aromatization reaction. Generally, this heavies fraction contains primarily trimethylbenzenes such as 1,2,3-trimethylbenzene, 1,2,4-trimethylbenzene, and 1,3,5-trimethylbenzene; tetramethylbenzenes such as 1,2,3,4-tetramethylbenzene, 1,2,3,5-tetramethylbenzene and 1,2,4,5-tetramethylbenzene; and naphthalenes. Additionally, n-propylbenzene, 3-ethyltoluene, 4-ethyltoluene, 3-n-propyltoluene, 4-n-propyltoluene, and 1,3-diethylbenzene can also be present in the fluid.

In a hydrodealkylation process benzene, toluene, ethylbenzene and xylenes are generally substantially absent from the fluid, i.e., the amount of each of these aromatic hydrocarbons is less than about 0.1 weight % in the fluid. However, in a transalkylation process, one or more of benzene, toluene, ethylbenzene and xylenes can be present in the feed to effect a significant alkylation of the lower aromatic hydrocarbons by the $C_9+$ aromatic compounds, i.e., significant transalkylation occurs. The condition for carrying out hydrodealkylation and transalkylation can be substantially the same as disclosed hereinbelow.

Any hydrogen-containing fluid which comprises, consists essentially of, or consists of, molecular hydrogen ($H_2$) can be used in the process of this invention. This hydrogen-containing fluid can therefore contain $H_2$ in the range of from about 1 to about 100, preferably about 5 to about 100, and most preferably 10 to 100 volume %. If the $H_2$ content in the fluid is less than 100%, the remainder of the fluid may be any inert gas such as, for example, $N_2$, He, Ne, Ar, steam, or combinations of any two or more thereof, or any other fluid which does not significantly affect the process or the catalyst composition used therein.

The contacting of a fluid feed stream containing a hydrocarbon with a hydrogen-containing fluid in the presence of the catalyst composition can be carried out in any technically suitable manner, in a batch or semicontinuous or continuous process, under a condition effective to convert a hydrocarbon or a $C_9+$ aromatic compound to a $C_6$ to $C_8$ aromatic hydrocarbon. Generally, a fluid stream as disclosed above, preferably being in the vaporized state, is introduced into a suitable hydroprocessing reactor having a fixed catalyst bed, or a moving catalyst bed, or a fluidized catalyst bed, or combinations of any two or more thereof by any means known to one skilled in the art such as, for example, pressure, meter pump, and other similar means. Because a hydroprocessing reactor and process therewith are well known to one skilled in the art, the description of which is omitted herein for the interest of brevity. The condition of the process of the invention can include a weight hourly space velocity of the fluid feed stream in the range of about 0.01 to about 100, preferably about 0.05 to about 50, and most preferably 0.1 to 30 g feed/g catalyst/hour. The hydrogen-containing fluid (gas) hourly space velocity generally is in the range of about 1 to about 10,000, preferably about 5 to about 7,000, and most preferably 10 to 10,000 $ft^3H_2/ft^3$ catalyst/hour. Generally, the pressure can be in the range of from about 10 to about 2000 psig, preferably about 100 to about 1000 psig, and most preferably 200 to 750 psig, and the temperature is about 250° to about 1000° C., preferably about 300° to about 750° C., and most preferably 400° to 650° C.

The process effluent generally contains a light gas fraction comprising hydrogen and methane; a $C_2$–$C_3$ fraction containing ethylene, propylene, ethane, and propane; an intermediate fraction including non-aromatic compounds having greater than 3 carbon atoms; a BTX aromatic hydrocarbons fraction (benzene, toluene, ortho-xylene, meta-xylene and para-xylene); and a $C_9+$ fraction which contains aromatic compounds having 9 or more carbon atoms per molecule.

Generally, the effluent can be separated into these principal fractions by any known methods such as, for example, fractionation distillation. Because the separation methods are well known to one skilled in the art, the description of which is omitted herein. The intermediate fraction can be fed to an aromatization reactor to be converted to aromatic hydrocarbons; methane, ethane, and propane can be used as fuel gas or as a feed for other reactions such as, for example, in a thermal cracking process to produce ethylene and propylene. The olefins can be recovered and further separated into individual olefins by any method known to one skilled in the art. The individual olefins can then be recovered and marketed. The BTX fraction can be further separated into individual $C_6$ to $C_8$ aromatic hydrocarbon fractions. Alternatively, the BTX fraction can further undergo one or more reactions either before or after separation to individual $C_6$ to $C_8$ hydrocarbons so as to increase the content of the most desired BTX aromatic hydrocarbon. Suitable examples of such subsequent $C_6$ to $C_8$ aromatic hydrocarbon conversions are disproportionation of toluene (to form benzene and xylenes), transalkylation of benzene and xylenes (to form toluene), and isomerization of meta-xylene and/or ortho-xylene to para-xylene.

After the catalyst composition has been deactivated by, for example, coke deposition or feed poisons, to an extent that the feed conversion and/or the selectivity to the desired ratios of olefins to BTX have become unsatisfactory, the catalyst composition can be reactivated by any means known to one skilled in the art such as, for example, calcining in air to burn off deposited coke and other carbonaceous materials, such as oligomers or polymers, preferably at a temperature of about 400° to about 1000° C. The optimal time periods of the calcining depend generally on the types and amounts of deactivating deposits on the catalyst composition and on the calcination temperatures. These optimal time periods can easily be determined by those possessing ordinary skills in the art and are omitted herein for the interest of brevity.

The following examples are presented to further illustrate this invention and are not to be construed as unduly limiting the scope of the present invention.

EXAMPLE I

This example illustrates the preparations of a mordenite zeolite materials.

Catalyst A was a control. First, a commercial mordenite material, which had been provided by PQ (Conshohocken, Pa.) as 1/16 inch extrudates under the production designation of CVB-20A was employed as starting material. This material (70.58 g) was calcined in air (muffle furnace) for about 2 hours at 525° C. to produce 69.09 g of catalyst A.

Catalyst B was also a control. It was prepared by impregnating 10 g of the commercial mordenite described above with a solution containing 0.375 g of ammonium heptamolybdate (($NH_4)_6Mo_7O_{24}\cdot 4H_2O$) and 4.50 g $H_2O$ by incipient wetness method. The impregnated mordenite was calcined in air for 6 hours at about 538° C. to produce 10 g of molybdenum-impregnated mordenite (Mo/mordenite) containing 2.038 weight % Mo by calculation.

Catalyst C was another control and was obtained essentially according to the procedure for preparing catalyst B described above, except that the 0.25 g of cobalt nitrate ($Co(NO_3)_2\cdot 6H_2O$) was used in place of ammonium heptamolybdate and 9.82 g of calcined material (Co/mordenite) was obtained. Catalyst C contained 0.515 weight % cobalt by calculation.

Catalyst D was obtained by impregnating 6 g of catalyst B (Mo/mordenite) with a solution containing 0.15 g of cobalt nitrate and 2.70 g of $H_2O$ followed by calcining at 538° C. for 6 hours to produce 6.17 g of catalyst D (Mo/Co/mordenite) which contained 2.038 weight % Mo and 0.492 weight % Co by calculation.

Catalyst E was obtained by impregnating 6.93 g of catalyst C (Co/mordenite) with 3.50 g of 7.7 weight % $(NH_4)_6Mo_7O_{24} \cdot 4H_2O$ followed by calcination at 538° C. for 6 hours to produce 7.03 g of cobalt/molybdenum-impregnated mordenite (Co/Mo/mordenite) which contained 2.038 weight % by calculation.

Catalyst F was obtained by simultaneously impregnating 10 g of the commercial mordenite described above with a solution containing 0.25 g of $Co(NO_3)_2 \cdot 6H_2O$ and 0.375 g of $(NH_4)_6Mo_7O_{24} \cdot 4H_2O$ and 4.50 g of water followed by calcination at 538° C. for 6 hours to produce 10.10g of Co/Mo/mordenite containing 2.018 weight % Mo and 0.501 weight % Co by calculation.

Catalyst G was prepared from a commercial zeolite Zeocat USY, obtained from UOP Incorporated, Des Plains, Ill. First, 10 g of Zeocat USY was impregnated with 6.68 g of a 6.57 weight % ammonium heptamolybdate solution followed by calcination as described above to produce 10.23 g of Mo-impregnated USP (Mo/USP). then, 6.82 g of the Mo/USP was further impregnated with 4.33 g of 4 weight % $Co(NO_3)_2 \cdot 6H_2O$ followed by calcination to produce 6.76 g of Mo/Co-impregnated USP (Mo/Co/USP) which contained 2.331 weight % Mo and 0.519 weight % Co.

Catalyst H was prepared from an alumina obtained from UCI (United Catalysts, Inc., Louisville, Ky.) having a product designation of CS-331-4. The alumina was first impregnated with 6.84 g of 6.57 weight % $(NH_4)_6Mo_7O_{24} \cdot 4H_2O$ followed by air calcination to produce 9.89 g of Mo-impregnated alumina ($Mo/Al_2O_3$). Of this 9.89 g, 6.60 g was further impregnated with 4.61 g of 4 weight % $Co(NO_3)_2 \cdot 6H_2O$ followed by calcination to produce a Mo/Co-impregnated alumina ($Mo/Co/Al_2O_3$) which contained 2.469 weight % Mo and 0.576 weight % Co by calculation.

were some paraffins, isoparaffins, and naphthenes as well as numerous unidentified components in the feed that are not shown in Table I.

TABLE I[A]

| Aromatics (weight %) | | |
|---|---|---|
| | $C_6$ | 0.000 |
| | $C_7$ | 50.248 |
| | $C_8$ | 0.411 |
| | $C_9$ | 11.315 |
| | $C_{10}$ | 12.664 |
| | $C_{11}$ | 9.457 |
| | $C_{12}$ | 3.001 |
| | Total | 87.096 |
| Sulfur (ppmw) | | 658 |

[a] $C_7$ was toluene.

A stainless-steel reactor tube (inner diameter: 2.5 cm; length: 50 cm) was filled with a 20 cm bottom layer of Alundum® alumina (inert, low surface area alumina, provided by Norton Company, Worcester, Mass.), 5 ml of one of the zeolite materials described in Example I, and a 20 cm top layer of Alundum®. The reactor and its content were pre-heated from room temperature to the desired reaction temperature of about 575° C. The zeolite materials (catalysts) were pretreated with flowing hydrogen gas at a rate of 260 ml per minute at 575° C. starting at 25° C. and ramping at 10° C./min. The reaction pressure was set at 500 psig. A liquid feed as shown in Table I was introduced into the heated reactor at a rate of 20 ml/hour, which was equivalent to a weight hourly space velocity of about 5.0–6.2 g catalyst/hour. The product, which exited the reactor, was cooled, analyzed by means of an online gas chromatograph at intervals of about 1 hour. Pertinent test results are summarized in Table II.

TABLE II

| Catal[a] | Supp[b] | Impreg[c] | Time[d] (hr) | Temp (°C.) | % Conv $C_9+$ | # Conv[e] Naph | wt % Xyln's | Avg wt % Coke/hr[f] |
|---|---|---|---|---|---|---|---|---|
| A | MOR | None | 7.60 | 506 | 8.2 | 2.9 | 2.0 | 2.133 |
| B | MOR | Mo | 7.23 | 502 | 71.7 | 73.7 | 24.9 | 0.864 |
| C | MOR | Co | 7.10 | 498 | 43.5 | 45.6 | 9.1 | 1.248 |
| D | MOR | Mo/Co | 6.97 | 495 | 75.4 | 84.3 | 23.9 | 0.401 |
| E | MOR | Co/Mo | 7.67 | 496 | 71.5 | 83.1 | 22.3 | 0.633 |
| F | MOR | CI | 7.00 | 550 | 74.2 | 66.7 | 21.5 | 1.430 |
| G | USY | Mo/Co | 5.73 | 500 | 43.6 | 50.2 | 11.4 | 3.221 |
| H | AL | Mo/Co | 3.89 | 498 | 16.4 | 15.6 | 1.8 | 2.864 |

[a] See catalyst designations in Example I.
[b] Support material: MOR, mordenite; USY, zeocat; and AL, alumina.
[c] Method of impregnation: none, no metal was impregnated; Mo, only molybdenum was impregnated; Co, only cobalt was impregnated; Mo/Co, molybdenum was first impregnated followed by cobalt impregnation; Co/Mo; cobalt was impregnated followed by molybdenum impregnation; and CI, molybdenum and cobalt were simultaneously co-impregnated.
[d] Time of transalkylation reaction.
[e] Conversion of naphthalenes.
[f] Coke was determined at the end of the reaction by removing the catalysts from the reactor and determined with a thermal gravimetric analyzer (TGA), manufactured by TA Instruments, New Castle, Delaware.

EXAMPLE II

This example illustrates the use of the zeolite and alumina materials (catalysts A-H) described in Example I in the transalklylation of a feed comprising $C_9+$ aromatic compounds and toluene to produce a product containing a higher concentration of BTX than the feed. The composition of aromatic compounds, up to 12 carbons per molecule, of the feed used for the transalkylation is shown in Table I. There The results shown in Table II demonstrate that the conversion of $C_9+$ aromatic compound using a mordenite (catalyst A) was low and very high coking rate was observed. Impregnation of mordenite with a metal compound (Mo or Co, catalysts B or C, respectively) improved the conversion of $C_9+$aromatic compounds, including naphthalenes, to xylenes and significantly reduced the coke rate in a transalkylation process as compared to a control (catalyst A). Table II also shows that, if the impregnation was sequentially carried out, the conversion of $C_9+$, weight % of xylenes in product stream, and reduction of coking rate were further improved. The best results were found with impregnation of Mo followed by Co (catalyst D). Table II further shows a zeocat zeolite (catalyst G) and alumina (catalyst H) had very poor conversion of $C_9+$ aromatic compounds (including naphthalenes), coking rate, and xylenes yield when used as catalyst support impregnated with Mo and Co by sequential impregnation.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A process comprising contacting a fluid, which comprises a $C_9+$ aromatic compound, with a catalyst composition under a condition sufficient to effect the conversion of said $C_9+$ aromatic compound to a $C_6$ to $C_8$ aromatic hydrocarbon wherein said catalyst composition is prepared by the steps comprising: (1) impregnating a mordenite zeolite with a molybdenum-containing compound to produce a molybdenum-promoted zeolite; (2) impregnating said molybdenum-promoted zeolite with a cobalt-containing compound to produce a cobalt/molybdenum-promoted zeolite; and (3) calcining said cobalt/molybdenum-promoted zeolite.

2. A process according to claim 1 further comprising treating said metal-promoted zeolite with a reducing agent.

3. A process according to claim 1 wherein said molybdenum-promoted zeolite produced in step (1) is calcined prior to being impregnated with said cobalt-containing compound in step (2).

4. A process according to claim 3 wherein said molybdenum-containing compound is selected from the group consisting of molybdenum(II) acetate, ammonium molybdate, ammonium dimolybdate, ammonium heptamolybdate, phosphomolybdic acid, molybdenum(III) bromide, molybdenum(II) chloride, molybdenum(IV) chloride, molybdenum(V) chloride, molybdenum hexacarbonyl, molybdenum(IV) sulfide, sodium molybdate, potassium molybdate, molybdenum oxychloride, molybdenum fluoride, molybdenum(VI) tetrachloride oxide, ammonium tetrathiomolybdate, and combinations of two or more thereof; and said cobalt-containing compound is selected from the group consisting of cobalt(II) acetate, cobalt(II) acetylacetonate, cobalt(III) acetylacetonate, cobalt(II) benzoylacetonate, cobalt(II) bromide, cobalt(II) carbonate, cobalt(II) chloride, cobalt(II) 2-ethylhexanoate, cobalt(II) fluoride, cobalt(III) fluoride, cobalt(II) iodide, cobalt(II) iodide, cobalt(II) 2,3-naphthalocyanine, cobalt(II) nitrate, cobalt(II) oxalate, cobalt(II) perchlorate, cobalt(II) phthalocyanine, cobalt(II) sulfate, cobalt(II) thiocyanate, cobalt(II) tungstate, and combinations of two or more thereof.

5. A process according to claim 3 wherein said molybdenum-containing compound is ammonium heptamolybdate and said cobalt-containing compound is cobalt nitrate.

6. A process according to claim 1 wherein said molybdenum-containing compound is selected from the group consisting of molybdenum(II) acetate, ammonium molybdate, ammonium dimolybdate, ammonium heptamolybdate, phosphomolybdic acid, molybdenum(III) bromide, molybdenum(II) chloride, molybdenum(IV) chloride, molybdenum(V) chloride, molybdenum hexacarbonyl, molybdenum(IV) sulfide, sodium molybdate, potassium molybdate, molybdenum oxychloride, molybdenum fluoride, molybdenum(VI) tetrachloride oxide, ammonium tetrathiomolybdate, and combinations of two or more thereof; and said cobalt-containing compound is selected from the group consisting of cobalt(II) acetate, cobalt(II) acetylacetonate, cobalt(III) acetylacetonate, cobalt(II) benzoylacetonate, cobalt(II) bromide, cobalt(II) carbonate, cobalt(II) chloride, cobalt(II) 2-ethylhexanoate, cobalt(II) fluoride, cobalt(III) fluoride, cobalt(II) iodide, cobalt(II) iodide, cobalt(II) 2,3-naphthalocyanine, cobalt(II) nitrate, cobalt(II) oxalate, cobalt(II) perchlorate, cobalt(II) phthalocyanine, cobalt(II) sulfate, cobalt(II) thiocyanate, cobalt(II) tungstate, and combinations of two or more thereof.

7. A process according to claim 1 wherein said molybdenum-containing compound is ammonium heptamolybdate and said cobalt-containing compound is cobalt nitrate.

8. A process according to claim 1 wherein said fluid comprises said $C_9+$ aromatic compound and toluene.

9. A process comprising contacting a fluid, which comprises a $C_9+$ aromatic compound, with a catalyst composition under a condition sufficient to effect the conversion of said $C_9+$ aromatic compound to a $C_6$ to $C_8$ aromatic hydrocarbon wherein said catalyst composition is prepared by the steps comprising: (1) impregnating a mordenite zeolite with a cobalt-containing compound to produce a cobalt-promoted zeolite; (2) impregnating said cobalt-promoted zeolite with a molybdenum-containing compound to produce a cobalt/molybdenum-promoted zeolite; and (3) calcining said cobalt/molybdenum-promoted zeolite.

10. A process according to claim 9 wherein said cobalt-promoted zeolite produced in step (1) is calcined prior to being impregnated with said molybdenum-containing compound.

11. A process according to claim 10 wherein said molybdenum-containing compound is selected from the group consisting of molybdenum(II) acetate, ammonium molybdate, ammonium dimolybdate, ammonium heptamolybdate, phosphomolybdic acid, molybdenum(III) bromide, molybdenum(II) chloride, molybdenum(IV) chloride, molybdenum(V) chloride, molybdenum hexacarbonyl, molybdenum(IV) sulfide, sodium molybdate, potassium molybdate, molybdenum oxychloride, molybdenum fluoride, molybdenum(VI) tetrachloride oxide, ammonium tetrathiomolybdate, and combinations of two or more thereof; and said cobalt-containing compound is selected from the group consisting of cobalt(II) acetate, cobalt(II) acetylacetonate, cobalt(III) acetylacetonate, cobalt(II) benzoylacetonate, cobalt(II) bromide, cobalt(II) carbonate, cobalt(II) chloride, cobalt(II) 2-ethylhexanoate, cobalt(II) fluoride, cobalt(III) fluoride, cobalt(II) iodide, cobalt(II) iodide, cobalt(II) 2,3-naphthalocyanine, cobalt(II) nitrate, cobalt(II) oxalate, cobalt(II) perchlorate, cobalt(II) phthalocyanine, cobalt(II) sulfate, cobalt(II) thiocyanate, cobalt(II) tungstate, and combinations of two or more thereof.

12. A process according to claim 10 wherein said molybdenum-containing compound is ammonium heptamolybdate and said cobalt-containing compound is cobalt nitrate.

13. A process according to claim 9 wherein said molybdenum-containing compound is selected from the group consisting of molybdenum(II) acetate, ammonium molybdate, ammonium dimolybdate, ammonium heptamolybdate, phosphomolybdic acid, molybdenum(III)

bromide, molybdenum(II) chloride, molybdenum(IV) chloride, molybdenum(V) chloride, molybdenum hexacarbonyl, molybdenum(IV) sulfide, sodium molybdate, potassium molybdate, molybdenum oxychloride, molybdenum fluoride, molybdenum(VI) tetrachloride oxide, ammonium tetrathiomolybdate, and combinations of two or more thereof; and said cobalt-containing compound is selected from the group consisting of cobalt(II) acetate, cobalt(II) acetylacetonate, cobalt(III) acetylacetonate, cobalt(II) benzoylacetonate, cobalt(II) bromide, cobalt(II) carbonate, cobalt(II) chloride, cobalt(II) 2-ethylhexanoate, cobalt(II) fluoride, cobalt(III) fluoride, cobalt(II) iodide, cobalt(II) iodide, cobalt(II) 2,3-naphthalocyanine, cobalt(II) nitrate, cobalt(II) oxalate, cobalt(II) perchlorate, cobalt(II) phthalocyanine, cobalt(II) sulfate, cobalt(II) thiocyanate, cobalt(II) tungstate, and combinations of two or more thereof.

14. A process according to claim 9 wherein said molybdenum-containing compound is ammonium heptamolybdate and said cobalt-containing compound is cobalt nitrate.

15. A process comprising contacting a fluid, which comprises a $C_9+$ aromatic compound, with a catalyst composition under a condition sufficient to effect the conversion of said $C_9+$ aromatic compound to a $C_6$ to $C_8$ aromatic hydrocarbon wherein said catalyst composition is prepared by the steps comprising: (1) impregnating a mordenite zeolite with a molybdenum-containing compound to produce a molybdenum-promoted zeolite; (2) impregnating said molybdenum-promoted zeolite with a cobalt-containing compound to produce a cobalt/molybdenum-promoted zeolite; and (3) calcining said cobalt/molybdenum-promoted zeolite wherein the weight ratio of molybdenum to zeolite is in the range of from about 0.0001:1 to about 0.3:1;

said molybdenum-containing compound is selected from the group consisting of molybdenum(II) acetate, ammonium molybdate, ammonium dimolybdate, ammonium heptamolybdate, phosphomolybdic acid, molybdenum(III) bromide, molybdenum(II) chloride, molybdenum(IV) chloride, molybdenum(V) chloride, molybdenum hexacarbonyl, molybdenum(IV) sulfide, sodium molybdate, potassium molybdate, molybdenum oxychloride, molybdenum fluoride, molybdenum (VI) tetrachloride oxide, ammonium tetrathiomolybdate, and combinations of two or more thereof; and said cobalt-containing compound is selected from the group consisting of cobalt(II) acetate, cobalt(II) acetylacetonate, cobalt(III) acetylacetonate, cobalt(II) benzoylacetonate, cobalt(II) bromide, cobalt(II) carbonate, cobalt(II) chloride, cobalt(II) 2-ethylhexanoate, cobalt(II) fluoride, cobalt(III) fluoride, cobalt(II) iodide, cobalt(II) iodide, cobalt(II) 2,3-naphthalocyanine, cobalt(II) nitrate, cobalt(II) oxalate, cobalt(II) perchlorate, cobalt(II) phthalocyanine, cobalt(II) sulfate, cobalt(II) thiocyanate, cobalt(II) tungstate, and combinations of two or more thereof.

16. A process according to claim 15 wherein said molybdenum-containing compound is ammonium heptamolybdate, said cobalt-containing compound is cobalt nitrate, and said molybdenum-promoted zeolite produced in step (1) is calcined before being impregnated with said cobalt-containing compound.

17. A process according to claim 16 wherein said condition comprises an hourly space velocity of said fluid in the range of about 0.01 g/g catalyst/hour to about 100 g/g catalyst/hour, a pressure in the range of about 10 psig to about 2000 psig, and a temperature in the range of about 250° C. to about 1,000° C.

18. A process comprising contacting a fluid, which comprises a $C_9+$ aromatic compound, with a catalyst composition under a condition sufficient to effect the conversion of said $C_9+$ aromatic compound to a $C_6$ to $C_8$ aromatic hydrocarbon wherein said catalyst composition is prepared by the steps comprising: (1) contacting a mordenite zeolite with a molybdenum-containing compound under a condition effective to incorporate said molybdenum-containing compound into said zeolite to produce a molybdenum-promoted zeolite; and (2) calcining said molybdenum-promoted zeolite under a condition sufficient to produce a calcined molybdenum-promoted zeolite; (3) impregnating said calcined molybdenum-promoted zeolite with a cobalt-containing compound to produce a Mo/Co-impregnated zeolite; (4) calcining said Mo/Co-promoted zeolite; and (5) treating said calcined Mo/Co-promoted zeolite with a reducing agent under a condition effective to lower the oxidation state of molybdenum and cobalt in the Mo/Co-promoted zeolite wherein the weight ratio of molybdenum to zeolite is in the range of from about 0.0001:1 to about 0.3:1;

said molybdenum-containing compound is selected from the group consisting of molybdenum(II) acetate, ammonium molybdate, ammonium dimolybdate, ammonium heptamolybdate, phosphomolybdic acid, molybdenum(III) bromide, molybdenum(II) chloride, molybdenum(IV) chloride, molybdenum(V) chloride, molybdenum hexacarbonyl, molybdenum(IV) sulfide, sodium molybdate, potassium molybdate, molybdenum oxychloride, molybdenum fluoride, molybdenum (VI) tetrachloride oxide, ammonium tetrathiomolybdate, and combinations of two or more thereof; and said cobalt-containing compound is selected from the group consisting of cobalt(II) acetate, cobalt(II) acetylacetonate, cobalt(III) acetylacetonate, cobalt(II) benzoylacetonate, cobalt(II) bromide, cobalt(II) carbonate, cobalt(II) chloride, cobalt(II) 2-ethylhexanoate, cobalt(II) fluoride, cobalt(III) fluoride, cobalt(II) iodide, cobalt(II) iodide, cobalt(II) 2,3-naphthalocyanine, cobalt(II) nitrate, cobalt(II) oxalate, cobalt(II) perchlorate, cobalt(II) phthalocyanine, cobalt(II) sulfate, cobalt(II) thiocyanate, cobalt(II) tungstate, and combinations of two or more thereof.

19. A process according to claim 18 wherein said molybdenum-containing compound is ammonium heptamolybdate; and said cobalt-containing compound is cobalt nitrate.

20. A process according to claim 18 wherein said process is carried out in the presence of a hydrogen-containing fluid.

21. A process comprising contacting a fluid, which comprises a $C_9+$ aromatic compound, with a catalyst composition under a condition sufficient to effect the conversion of said $C_9+$ aromatic compound to a $C_6$ to $C_8$ aromatic hydrocarbon wherein said catalyst composition is prepared by the steps comprising: (1) contacting a mordenite zeolite with a cobalt-containing compound under a condition effective to incorporate said cobalt-containing compound into said zeolite to produce a cobalt-promoted zeolite; and (2) calcining said cobalt-promoted zeolite under a condition sufficient to produce a calcined cobalt-promoted zeolite; (3) impregnating said calcined cobalt-promoted zeolite with a molybdenum-containing compound to produce a Mo/Co-impregnated zeolite; (4) calcining said Mo/Co-promoted zeolite; and (5) treating said calcined Mo/Co-promoted zeolite with a reducing agent wherein the weight ratio of cobalt to zeolite is in the range of from about 0.0001:1 to about 0.3:1.

22. A process according to claim 21 wherein said molybdenum-containing compound is ammonium heptamolybdate; and said cobalt-containing compound is cobalt nitrate.

23. A process for converting a $C_9+$ aromatic compound, in the presence of hydrogen, to a $C_6$–$C_8$ aromatic hydrocarbon comprising contacting said $C_9+$ aromatic compound with a catalyst composition wherein said $C_9+$ aromatic compound has the formula of $R'_q Ar$ wherein each R' is a hydrocarbyl radical having 1 to about 15 carbon atoms and is independently selected from the group consisting of alkyl radicals, aryl radicals, alkaryl radicals, aralkyl radicals, alkenyl radicals, and combinations of any two or more thereof, q is a whole number from 1 to 5, and Ar is a an aryl group;

said process is carried out at an hourly space velocity of said fluid in the range of 0.1 g/g catalyst/hour to 30 g/g catalyst/hour, a pressure in the range of 200 psig to 750 psig, and a temperature in the range of 450° C. to 650° C.;

said catalyst is prepared by the steps comprising: (1) impregnating a mordenite with an aqueous ammonium heptamolybdate solution under a condition sufficient to produce a molybdenum-promoted mordenite; and (2) calcining said molybdenum-promoted mordenite at 450° C. to 650° C. for 2 to 15 hours; (3) impregnating said molybdenum-promoted mordenite with a cobalt nitrate solution to produce a Mo/Co-promoted mordenite; (4) calcining said Mo/Co-promoted mordenite at 450° C. to 650° C. for 2 to 15 hours; and (5) reducing the oxidation state of molybdenum in said Mo/Co-promoted mordenite with hydrogen; and the weight ratio of molybdenum to zeolite is in the range of from about 0.0001:1 to about 0.3:1.

24. A process according to claim 23 wherein said $C_9+$ aromatic compound comprises toluene.

* * * * *